United States Patent
Weijenbergh et al.

(10) Patent No.: US 7,248,555 B2
(45) Date of Patent: Jul. 24, 2007

(54) DEVICE AND METHOD FOR RECORDING INFORMATION ENABLING REDUCED RESPONSE TIME OF A RECORDING DEVICE

(75) Inventors: Paulus Gijsbertus Petrus Weijenbergh, Eindhoven (NL); Jakob Gerrit Nijboer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 11/271,477

(22) Filed: Nov. 10, 2005

(65) Prior Publication Data

US 2006/0067194 A1 Mar. 30, 2006

Related U.S. Application Data

(62) Division of application No. 10/131,775, filed on Apr. 24, 2002, now Pat. No. 7,082,092.

(30) Foreign Application Priority Data

Apr. 24, 2001 (EP) .................................. 01201480
Feb. 28, 2002 (EP) .................................. 02075805

(51) Int. Cl.
  *G11B 7/0045* (2006.01)
  *G11B 7/24* (2006.01)
(52) U.S. Cl. ................................ 369/59.25; 369/257.3

(58) Field of Classification Search .................... None
See application file for complete search history.

(56) References Cited

U.S. PATENT DOCUMENTS

| | | | |
|---|---|---|---|
| 5,341,356 | A | 8/1994 | Dieleman et al. |
| 5,623,470 | A | 4/1997 | Asthana et al. |
| 5,778,257 | A | 7/1998 | Tsukatani et al. |
| 5,825,726 | A | 10/1998 | Hwang et al. |
| 6,751,176 | B1 | 6/2004 | Kanda et al. |
| 2003/0142604 | A1 | 7/2003 | Nakamura |

FOREIGN PATENT DOCUMENTS

WO   WO 98/16014   4/1998

*Primary Examiner*—Andrea Wellington
*Assistant Examiner*—Peter Vincent Agustin

(57) ABSTRACT

A method and device for recording multiple information volumes on a record carrier, usually called multi-session recording, has a mapping unit (31) for opening a session by recording intro data including a first buffer zone at the beginning of the start zone of the volume, and a session control block (SDCB) in a remaining blank area of the start zone after the buffer zone. The session control block includes volume data indicative of the status and the contents of the session. The session is closed by recording session control data indicating that the information volume is closed in the remaining blank area, and closure data after the last user information recorded in the data zone for constituting the end zone of the volume. Further, the device has a detecting unit (32) for retrieving the session control block from said start zone.

3 Claims, 19 Drawing Sheets

| | Initial Zone | |
|---|---|---|
| Physical Sector 144 512 | Inner Disc Test Zone<br>16 384 Physical Sectors | Physical Sector (023480) |
| Physical Sector 160 895 | | Physical Sector (02747F) |
| Physical Sector 160 896 | Inner Disc Count Zone<br>4 096 Physical Sectors | Physical Sector (027480) |
| Physical Sector 164 991 | | Physical Sector (02847F) |
| Physical Sector 164 992 | Inner Disc Administration Zone<br>4 096 Physical Sectors | Physical Sector (028480) |
| Physical Sector 169 087 | | Physical Sector (02947F) |
| Physical Sector 169 088 | Session Map Zone<br>4 096 Physical Sectors | Physical Sector (029480) |
| Physical Sector 173 183 | | Physical Sector (02A47F) |
| | Guard Zone 1 | |

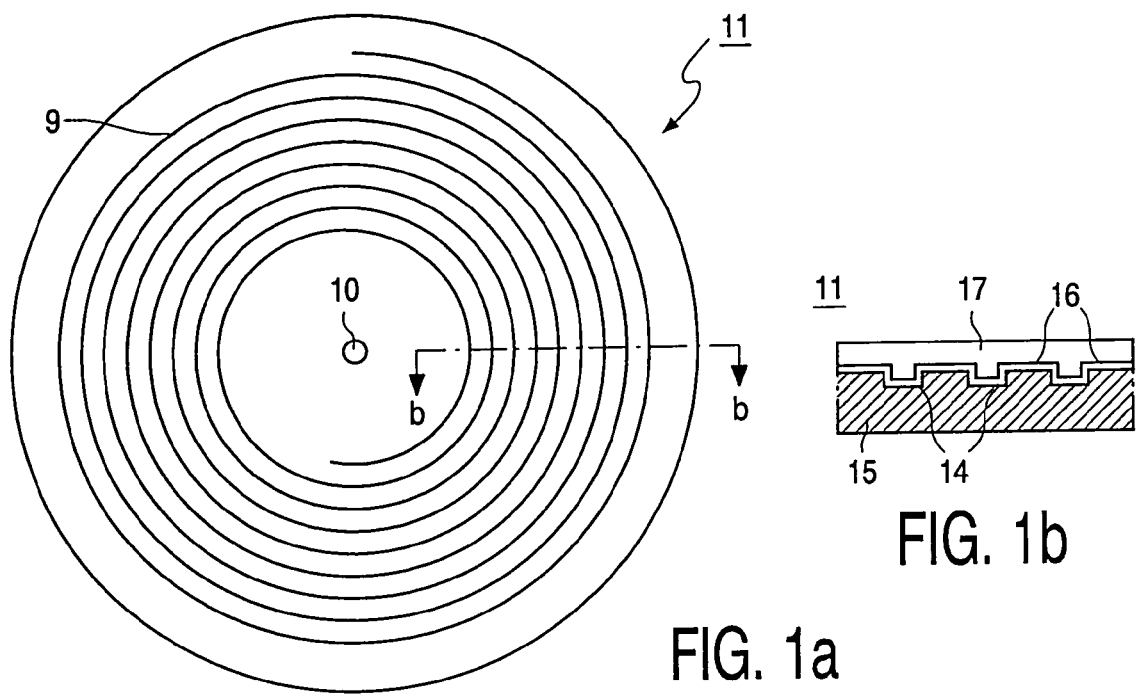
FIG. 1a
FIG. 1b
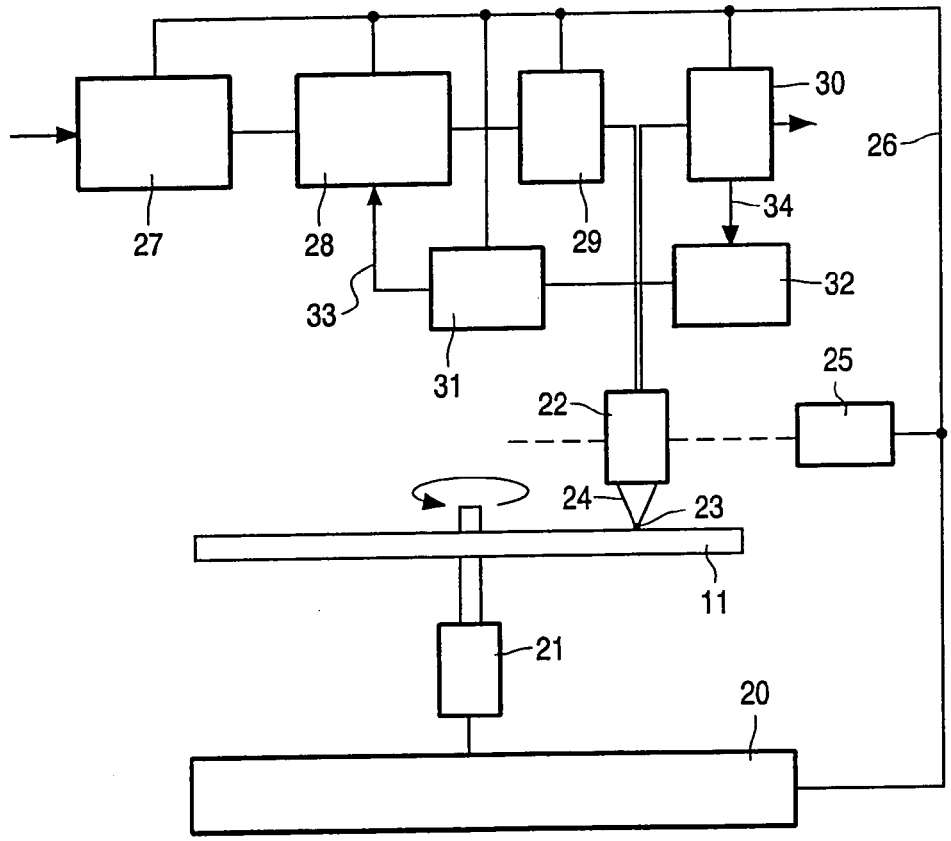
FIG. 2

| nibble N 0 | bit 0 | bit 1 | bit 2 | bit 3 | ← 6 nibbles → ADIP address |
|---|---|---|---|---|---|
| nibble N 1 | bit 4 | bit 5 | .. | .. | |
| .. | .. | .. | .. | .. | |
| .. | bit 20 | .. | .. | bit 23 | |
| nibble N 7 | bit 24 | .. | .. | .. | ← 2 nibbles → AUX data |
| nibble N 8 | bit 28 | .. | .. | bit 31 | |
| .. | bit 32 | .. | .. | .. | ← 5 nibbles → Nibble based R-S ECC |
| .. | .. | .. | .. | .. | |
| .. | .. | .. | .. | .. | |
| nibble N 12 | bit 48 | bit 49 | bit 50 | bit 51 | |

FIG.5

| Byte number | Content | Number of bytes |
|---|---|---|
| 0 | Disc Category and Version Number | 1 |
| 1 | Disc size | 1 |
| 2 | Disc structure | 1 |
| 3 | Recording density | 1 |
| 4 to 15 | Data Zone allocation | 12 |
| 16 | Set to (00) | 1 |
| 17 to 18 | Reserved – All (00) | 2 |
| 19 to 26 | Disc Manufacturer ID | 8 |
| 27 to 29 | Media type ID | 3 |
| 30 | Product revision number | 1 |
| 31 | number of Physical format information bytes in use | 1 |
| 32 | Reference recording velocity | 1 |
| 33 | Maximum recording velocity | 1 |
| 34 | Wavelength $\lambda_{IND}$ | 1 |
| 35 | (TBD) | |
| 36 | Maximum read power at reference velocity | 1 |
| 37 | $P_{IND}$ at reference velocity | 1 |
| 38 | $\beta_{target}$ at reference velocity | 1 |
| 39 | Maximum read power at maximum velocity | 1 |
| 40 | $P_{IND}$ at maximum velocity | 1 |
| 41 | $\beta_{target}$ at maximum velocity | 1 |
| 42 | $T_{top}$ (≥4) first pulse duration for $cm^1$ ≥4 at reference velocity | 1 |
| 43 | $T_{top}$ (=3) first pulse duration for $cm^1$ =3 at reference velocity | 1 |
| 44 | $T_{mp}$ multi pulse duration at reference velocity | 1 |
| 45 | $T_{lp}$ last pulse duration at reference velocity | 1 |
| 46 | $dT_{top}$ first pulse lead time at reference velocity | 1 |
| 47 | $dT_{le}$ 1$^{st}$ pulse leading edge correction for $ps^2$ =3 | 1 |
| 48 | $T_{top}$ (≥4) first pulse duration for $cm^1$ ≥4 at maximum velocity | 1 |
| 49 | $T_{top}$ (=3) first pulse duration for $cm^1$ =3 at maximum velocity | 1 |
| 50 | $T_{mp}$ multi pulse duration at maximum velocity | 1 |
| 51 | $T_{lp}$ last pulse duration at maximum velocity | 1 |
| 52 | $dT_{top}$ first pulse lead time at maximum velocity | 1 |
| 53 | $dT_{le}$ 1$^{st}$ pulse leading edge correction for $ps^2$ =3 | 1 |
| 54 to 255 | Reserved - All (00) | 202 |

FIG.7

| bit 7 to bit 4 | dT$_{le}$ shift (T w) |
|---|---|
| 0000 | 0 |
| 0001 | 0,0625 |
| 0010 | 0,1250 |
| 0011 | 0,1875 |
| 0100 | 0,2500 |
| 0101 to 1011 | reserved |
| 1100 | -0,2500 |
| 1101 | -0,1875 |
| 1110 | -0,1250 |
| 1111 | -0,0625 |

FIG.8

|  | Description | Nominal radius in mm | PSN of the first Physical Sector | Number of Physical Sectors |
| --- | --- | --- | --- | --- |
| Inner Drive Area | Initial Zone | start 22,000 mm | -- | blank |
|  | Inner Disc Test Zone | start 22,643 mm | (023480) | 16 384 |
|  | Inner Disc Count Zone | start 23,079 mm | (027480) | 4 096 |
|  | Inner Disc Administration Zone | start 23,186 mm | (028480) | 4 096 |
|  | Session Map Zone | start 23,293 mm | (029480) | 4 096 |
| Lead-in | Guard Zone 1 | start 23,400 mm | (02A480) | 14 848 |
|  | Reserved Zone 1 |  | (02DE80) | 4 096 |
|  | Reserved Zone 2 |  | (02EE80) | 64 |
|  | Inner Disc Identification Zone |  | (02EEC0) | 256 |
|  | Reserved Zone 3 |  | (02EFC0) | 64 |
|  | Reference Code Zone | start 23,896 mm | (02F000) | 32 |
|  | Buffer Zone 1 |  | (02F020) | 480 |
|  | Control Data Zone |  | (02F200) | 3 072 |
|  | Buffer Zone 2 |  | (02FE00) | 512 |
| Data | Data Zone | start 24,000 mm | (030000) | 2 295 104 max |
| Lead-out | Buffer Zone 3 | start 58,000 mm max | (260540) max | 768 |
|  | Outer Disc Identification Zone |  | (260840) max | 256 |
|  | Guard Zone 2 |  | (260940) max | 4096 min |
| Outer Drive Area | Outer Disc Administration Zone | start 58,053 mm | (261940) | 4096 |
|  | Outer Disc Count Zone | start 58,096 mm | (262940) | 4096 |
|  | Outer Disc Test Zone | start 58,139 mm | (263940) | 16 384 |
|  | Guard Zone 3 | start 58,310 mm | (2652C0) | blank |

FIG.10

| | Initial Zone | |
|---|---|---|
| Physical Sector 144 512 | Inner Disc Test Zone<br>16 384 Physical Sectors | Physical Sector (023480) |
| Physical Sector 160 895 | | Physical Sector (02747F) |
| Physical Sector 160 896 | Inner Disc Count Zone<br>4 096 Physical Sectors | Physical Sector (027480) |
| Physical Sector 164 991 | | Physical Sector (02847F) |
| Physical Sector 164 992 | Inner Disc Administration Zone<br>4 096 Physical Sectors | Physical Sector (028480) |
| Physical Sector 169 087 | | Physical Sector (02947F) |
| Physical Sector 169 088 | Session Map Zone<br>4 096 Physical Sectors | Physical Sector (029480) |
| Physical Sector 173 183 | | Physical Sector (02A47F) |
| | Guard Zone 1 | |

FIG.11

| Physical Sector of SEM block | Main Data byte position | Description | number of bytes |
|---|---|---|---|
| 0 | $D_0$ to $D_3$ | Content Descriptor | 4 |
| 0 | $D_4$ to $D_7$ | Reserved and set to (00) | 4 |
| 0 | $D_8$ to $D_{39}$ | Drive ID | 32 |
| 0 | $D_{40}$ to $D_{63}$ | Reserved and set to (00) | 24 |
| 0 | $D_{64}$ to $D_{95}$ | Session item 0 | 16 |
| 0 | ... | | |
| 0 | $D_{64+i \times 16}$ to $D_{95+i \times 16}$ | Session item i | 16 |
| 0 | ... | ... | |
| 0 | $D_{64+(N-1) \times 16}$ to $D_{95+(N-1) \times 16}$ | Session item N-1 | 16 |
| 0 | $D_{64+N \times 16}$ to $D_{2\,047}$ | Reserved and set to (00) | 1 984 - Nx16 |
| 1 to 15 | $D_0$ to $D_{2\,047}$ | Reserved and set to (00) | 15×2 048 |

FIG.12

| Item byte position | Description | number of bytes |
|---|---|---|
| $B_0$ to $B_2$ | Session item descriptor | 3 |
| $B_3$ | Session number | 1 |
| $B_4$ to $B_7$ | Session start address | 4 |
| $B_8$ to $B_{11}$ | Session end address | 4 |
| $B_{12}$ to $B_{15}$ | Reserved and set to (00) | 4 |

FIG.13

| | Session Map Zone | |
|---|---|---|
| Physical Sector 173 184 | Guard Zone 1<br>14 848 Physical Sectors<br>with Main Data set to (00) | Physical Sector (02A480) |
| Physical Sector 188 031 | | Physical Sector (02DE7F) |
| Physical Sector 188 032 | Reserved Zone 1<br>4 096 Physical Sectors | Physical Sector (02DE80) |
| Physical Sector 192 127 | | Physical Sector (02EE7F) |
| Physical Sector 192 128 | Reserved Zone 2<br>64 Physical Sectors | Physical Sector (02EE80) |
| Physical Sector 192 191 | | Physical Sector (02EEBF) |
| Physical Sector 192 192 | Inner Disc Identification Zone<br>256 Physical Sectors | Physical Sector (02EEC0) |
| Physical Sector 192 447 | | Physical Sector (02EFBF) |
| Physical Sector 192 448 | Reserved Zone 3<br>64 Physical Sectors | Physical Sector (02EFC0) |
| Physical Sector 192 511 | | Physical Sector (02EFFF) |
| Physical Sector 192 512 | Reference Code Zone<br>32 Physical Sectors | Physical Sector (02F000) |
| Physical Sector 192 543 | | Physical Sector (02F01F) |
| Physical Sector 192 544 | Buffer Zone 1<br>480 Physical Sectors<br>with Main Data set to (00) | Physical Sector (02F020) |
| Physical Sector 193 023 | | Physical Sector (02F1FF) |
| Physical Sector 193 024 | Control Data Zone<br>3 072 Physical Sectors | Physical Sector (02F200) |
| Physical Sector 196 095 | | Physical Sector (02FDFF) |
| Physical Sector 196 096 | Buffer Zone 2<br>512 Physical Sectors<br>with Main Data set to (00) | Physical Sector (02FE00) |
| Physical Sector 196 607 | | Physical Sector (02FFFF) |
| | Data Zone | |

FIG.15

| Physical format information<br>2 048 bytes |
|---|
| Disc manufacturing information<br>2 048 bytes |
| Content provider information<br><br>14 x 2 048 bytes |

FIG.16

| | | Physical Sector (261940) |
|---|---|---|
| Physical Sector 2 496 832 | Guard Zone 2 | |
| Physical Sector 2 500 927 | Outer Disc Administration Zone<br>4 096 Physical Sectors | Physical Sector (26293F) |
| Physical Sector 2 500 928 | | Physical Sector (262940) |
| Physical Sector 2 505 023 | Outer Disc Count Zone<br>4 096 Physical Sectors | Physical Sector (26393F) |
| Physical Sector 2 505 024 | | Physical Sector (263940) |
| Physical Sector 2 521 407 | Outer Disc Test Zone<br>16 384 Physical Sectors | Physical Sector (26793F) |
| Physical Sector 2 521 408 | Guard Zone 3<br>Blank | Physical Sector (267940) |

FIG. 18

| Session | Zone | Description | | Number of Physical Sectors |
|---|---|---|---|---|
| | Inner Drive Area | -- | See Fig. 11 | -- |
| Session 1 | Lead-in | ... | See Fig. 15 | ... |
| | | Reserved Zone 2 | | 64 |
| | | Inner Disc Identification Zone | | 256 |
| | | ... | | ... |
| | | Control Data Zone | | 3 072 |
| | | Buffer Zone 2 | | 512 |
| | Data | Data Zone | | 16 min |
| | Closure | Buffer Zone C | | 768 |
| | | Outer Session Identification Zone | | 256 |
| Session 2 | Intro | Buffer Zone A | | 64 |
| | | Inner Session Identification Zone | | 256 |
| | | Session Control Data Zone | | 640 |
| | | Buffer Zone B | | 64 |
| | Data | Data Zone | | 16 min |
| | Closure | Buffer Zone C | | 768 |
| | | Outer Session Identification Zone | | 256 |
| ⋮ | ⋮ | ⋮ | | ... |
| Session N | Data | Data Zone | | |
| | Lead-out | Buffer Zone 3 | See Fig. 17 | 768 |
| | | Outer Disc Identification Zone | | 256 |
| | | ... | | ... |
| | Outer Drive Area | -- | See Fig. 18 | -- |

FIG.19

| | | | |
|---|---|---|---|
| Session n-1 | Data | Data Zone | User Data |
| | Closure | Buffer Zone C | 48 ECC Blocks with (00) |
| | | Outer Session Identification Zone | 16 ECC Blocks with DCBs and/or (00) |
| Session n | Intro | Buffer Zone A | 4 ECC Blocks with (00) |
| | | Inner Session Identification Zone | 1 ECC Block with an SDCB |
| | | | blank |
| | | Session Control Data Zone | blank |
| | | Buffer Zone B | 4 ECC Blocks with (00) |
| | Data | Data Zone | Reserved Area (optional) |
| | | | User Data |
| | | | blank |

FIG.20

| Physical Sector of each DCB | Main Data BP | Description |
|---|---|---|
| 0 | $D_0$ to $D_3$ | Content Descriptor |
| 0 | $D_4$ to $D_7$ | Unknown Content Descriptor Actions |
| 0 | $D_8$ to $D_{39}$ | Drive ID |
| 0 | $D_{40}$ to $D_{2\,047}$ | Content Descriptor Specific |
| 1 to 15 | $D_0 - D_{2\,047}$ | Content Descriptor Specific |

FIG.21

| Physical Sector of ECC block | Main Data byte position | Description | number of bytes |
|---|---|---|---|
| 0 | $D_0$ to $D_3$ | Content Descriptor | 4 |
| 0 | $D_4$ to $D_7$ | Unknown Content Descriptor Actions | 4 |
| 0 | $D_8$ to $D_{39}$ | Drive ID | 32 |
| 0 | $D_{40}$ to $D_{41}$ | Session number | 2 |
| 0 | $D_{42}$ to $D_{63}$ | Reserved and set to (00) | 22 |
| 0 | $D_{64}$ to $D_{95}$ | Disc ID (in Lead-In Zone only) | 32 |
| 0 | $D_{96}$ to $D_{127}$ | Application Dependent | 32 |
| 0 | $D_{128}$ to $D_{143}$ | SES item 0 | 16 |
| 0 | ... | ... | |
| 0 | $D_{128+i \times 16}$ to $D_{143+i \times 16}$ | SES item i | 16 |
| 0 | ... | ... | |
| 0 | $D_{128+(N-1) \times 16}$ to $D_{143+(N-1) \times 16}$ | SES item N-1 | 16 |
| 0 | $D_{128+N \times 16}$ to $D_{2\,047}$ | Reserved and set to (00) | 1 920 - N×16 |
| 1 to 15 | $D_0$ to $D_{2\,047}$ | Reserved and set to (00) | 15×2 048 |

FIG.22

| Item byte position | Description | number of bytes |
|---|---|---|
| $B_0$ to $B_2$ | Reserved Area item descriptor | 3 |
| $B_3$ | Reserved Area number | 1 |
| $B_4$ to $B_7$ | Reserved Area start address | 4 |
| $B_8$ to $B_{11}$ | Reserved Area end address | 4 |
| $B_{12}$ to $B_{15}$ | Reserved and set to (00) | 4 |

FIG.23

| Item byte position | Description | number of bytes |
|---|---|---|
| $B_0$ to $B_2$ | Previous Session item descriptor | 3 |
| $B_3$ | Previous Session number | 1 |
| $B_4$ to $B_7$ | Previous Session start address | 4 |
| $B_8$ to $B_{11}$ | Previous Session end address | 4 |
| $B_{12}$ to $B_{15}$ | Reserved and set to (00) | 4 |

FIG.24

DEVICE AND METHOD FOR RECORDING INFORMATION ENABLING REDUCED RESPONSE TIME OF A RECORDING DEVICE

CROSS-REFERENCE TO RELATED APPLICATIONS

This is a divisional application of U.S. patent application Ser. No. 10/131,775, now U.S. Pat. No. 7,082,092 filed Apr. 24, 2002.

BACKGROUND OF THE INVENTION

1. Field of the Invention

The invention relates to a device for recording information in at least one information volume in a track in a recordable area on a record carrier, the information volume comprising a start zone, a data zone and an end zone, and the device comprising recording means for recording marks representing the information, and control means for recording and retrieving the information volume.

The invention further relates to a method of recording information in at least one information volume in a track in a recordable area on a record carrier, the information volume comprising a start zone, a data zone and an end zone, and the method comprising recording marks representing the information and control data constituting the information volume.

The invention further relates to a record carrier having a track in a recordable area for recording at least one information volume, the information volume comprising a start zone, a data zone and an end zone, and the track comprising marks representing the information and control data constituting the information volume.

2. Description of the Related Art

A device and method for recording information signals on a record carrier is known from U.S. Pat. No. 5,341,356 (PHN13661). The information is encoded in information blocks each comprising data words and error correction words for correcting errors within the information block. The device comprises recording means for recording marks representing the information blocks. The information of at least one information block is modulated with a modulated signal and recorded in the track at predefined locations indicated by preformed track position information. The device records the information formatted in successive volumes, also called sessions, in a multi-session layout. Each volume has a start zone, also called lead-in, a data zone, and an end zone, also called lead-out. The device has control means for recording and retrieving position data indicative of the position of the recorded information volumes. In particular, in the lead-out, a pointer is recorded for locating the start zone of the session. Further, the lead-in contains information about the position of the lead-out of that session, and, hence, of the start zone of the next session (if any). For locating a specific session, the device may locate the last recorded session by detecting the border of the unrecorded area and reading the last lead-out, and follow the chain of sessions to the start of the recorded area. Alternatively, the device may read the lead-in of the first session, and follow the chain of sessions by reading the lead-ins of the consecutive volumes. Further session information, e.g., about the status and contents of the sessions, may be stored in a separate area outside the user data zone. The time for accessing a specific session is determined by the amount of time required for jumping along said chain of sessions and retrieving the session information. In a write-once type of record carrier, like CD-R, the position data cannot be overwritten.

SUMMARY OF THE INVENTION

It is an object of the invention to provide a more flexible system for recording the session information.

For this purpose, the device as described in the opening paragraph is characterized in that the control means comprises session means for opening a session by recording intro data, comprising a first buffer zone, at the beginning of the start zone of the volume, and at least one session control block in a remaining blank area of the start zone after the buffer zone, the session control block comprising volume data indicative of the status and the contents of the session, and for closing the session for constituting the information volume by recording session control data indicating that the information volume is closed in the remaining blank area, and closure data after the last information recorded in the data zone for constituting the end zone of the volume, and detecting means for retrieving the session control block from said start zone.

The method as described in the opening paragraph is characterized in that the method comprises opening a session by recording intro data, comprising a first buffer zone, at the beginning of the start zone of the volume, and at least one session control block in a remaining blank area of the start zone after the buffer zone, the session control block comprising volume data indicative of the status and the contents of the session, and closing the session for constituting the information volume by recording session control data indicating that the information volume is closed in the remaining blank area, and closure data after the last information recorded in the data zone for constituting the end zone of the volume.

The record carrier as described in the opening paragraph is characterized in that the record carrier comprises an open session having intro data, comprising a first buffer zone, at the beginning of the start zone of the volume, and at least one session control block in a remaining blank area of the start zone after the buffer zone, the session control block comprising volume data indicative of the status and the contents of the session, and a closed session constituting the information volume comprising session control data indicating that the information volume is closed in the start zone, and closure data after the last information recorded in the data zone for constituting the end zone of the volume.

Recording session control blocks in the start zone of the session has the advantage that for the currently open session, information for accessing that session and previous sessions is available at a location close to the location where user data is to be recorded. Keeping a blank area in the start zone allows further updates by writing further session control blocks during use of that session. When the session is to be closed, the remaining blank areas are recorded, which achieves compatibility with read-only type devices, which cannot cope with unrecorded areas. In addition, recording session control blocks in the start zone of the session is advantageous in that such session information is available for read-only devices. Such a read-only device usually cannot access any information zone located before the lead-in zone defined for read-only type of record carriers.

The invention is based on the following recognition. Applicants have seen that a substantial amount of the response time of a recording device to a recording request is due to the amount time required for retrieving position data of the session to be accessed. Subsequently, Applicants have seen that the response time can be decreased by recording the status and contents information about the session in the start zone of the session itself.

In an embodiment of the device, the session control block comprises at least one previous session item, the previous session item comprising a start and an end address of a previously recorded information volume. This is advantageous for locating recorded data in previous sessions. In particular this applies to deleted data, e.g., files in a computer application, which have been deleted by removing their references from the user content management data, e.g., according to an UDF file system. When such a deleted file has to be recovered, the device can access the earlier recorded sessions for retrieving earlier versions of the content management data, which still have the reference data of the deleted data.

BRIEF DESCRIPTION OF THE DRAWINGS

These and other aspects of the invention will be apparent from and elucidated further with reference to the embodiments described by way of example in the following description and with reference to the accompanying drawings, in which:

FIG. 1a shows a record carrier (top view);
FIG. 1b shows a record carrier (cross-section);
FIG. 2 shows a recording device;
FIG. 5 shows the ADIP error correction structure;
FIG. 7 shows a table of Physical disc information;
FIG. 8 shows leading edge correction times;
FIG. 10 shows a layout of a recorded single-session disc;
FIG. 11 shows the Inner Drive Area;
FIG. 12 shows a format of a Session Map block;
FIG. 13 shows a session item;
FIG. 15 shows the Lead-in Zone;
FIG. 16 shows the structure of a Control Data Block;
FIG. 18 shows the Outer Drive Area;
FIG. 19 shows the layout of the Information Zone of a Multi-session disc;
FIG. 20 shows details of opened Session n;
FIG. 21 shows the general format of a Disc Control Block (DCB);
FIG. 22 shows the Format of the Session DCB (SDCB);
FIG. 23 shows a Reserved Area item;
and
FIG. 24 shows a Previous Session item.

Corresponding elements in different Figures have identical reference numerals.

DESCRIPTION OF THE PREFERRED EMBODIMENTS

Figure 3:
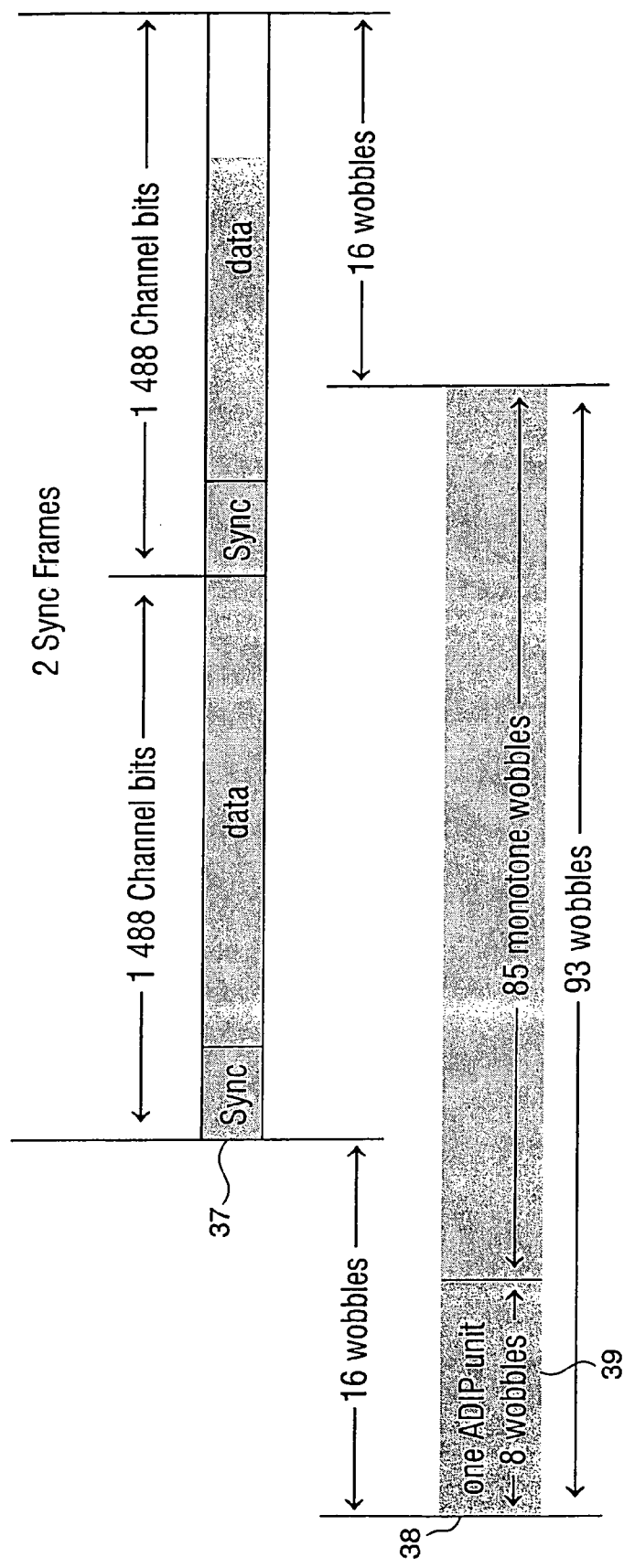
FIG. 3 shows the alignment of ADIP and information blocks.

FIG. 1a shows a disc-shaped record carrier 11 having a track 9 and a central hole 10. The track 9, being the position of the series of (to be) recorded marks representing information, is arranged in accordance with a spiral pattern of turns constituting substantially parallel tracks on an information layer. The record carrier may be optically readable, called an optical disc, and has an information layer of a recordable type. Examples of a recordable disc are the CD-R and CD-RW, and writable versions of DVD, such as DVD+RW. Further details about the DVD disc can be found in reference: ECMA-267: 120 mm DVD—Read-Only Disc— (1997). The information is represented on the information layer by recording optically detectable marks along the track, e.g., crystalline or amorphous marks in phase change material. The track 9 on the recordable type of record carrier is indicated by a pre-embossed track structure provided during manufacture of the blank record carrier. The track structure is constituted, for example, by a pre-groove 14 which enables a read/write head to follow the track during scanning. The track structure comprises position information, e.g., addresses, for indication the location of units of information, usually called information blocks. The position information includes specific synchronizing marks for locating the start of such information blocks. The position information is encoded in frames of modulated wobbles as described below.

FIG. 1b is a cross-section taken along the line b-b of the record carrier 11 of the recordable type, in which a transparent substrate 15 is provided with a recording layer 16 and a protective layer 17. The protective layer 17 may comprise a further substrate layer, for example, as in DVD where the recording layer is at a 0.6 mm substrate and a further substrate of 0.6 mm is bonded to the back side thereof. The pre-groove 14 may be implemented as an indentation or an elevation of the substrate 15 material, or as a material property deviating from its surroundings.

The record carrier 11 is intended for carrying information represented by modulated signals comprising frames. A frame is a predefined amount of data preceded by a synchronizing signal. Usually, such frames also comprise error correction codes, e.g., parity words. A number of such frames constitute an information block, the information block comprising further error correction words. The information block is the smallest recordable unit from which information can be reliably retrieved. An example of such a recording system is known from the DVD system, in which the frames carry 172 data words and 10 parity words, and 208 frames constitute an ECC block.

In an embodiment of the record carrier, the track comprises multi-session information according to the format described below with reference to FIGS. 19 to 24.

FIG. 2 shows a recording device for writing information on a record carrier 11 of a type which is writable or re-writable, for example, CD-R or CD-RW. The device is provided with recording means for scanning the track on the record carrier, the recording means including a drive unit 21 for rotating the record carrier 11, a head 22, a positioning unit 25 for coarsely positioning the head 22 in the radial direction on the track, and a control unit 20. The head 22 comprises an optical system of a known type for generating a radiation beam 24 guided through optical elements and focused to a radiation spot 23 on a track of the information layer of the record carrier. The radiation beam 24 is generated by a radiation source, e.g., a laser diode. The head further comprises (not shown) a focusing actuator for moving the focus of the radiation beam 24 along the optical axis of said beam and a tracking actuator for fine positioning of the spot 23 in a radial direction on the center of the track. The tracking actuator may comprise coils for radially moving an optical element, or may alternatively be arranged for changing the angle of a reflecting element. For writing information, the radiation is controlled to create optically detectable marks in the recording layer. For reading, the radiation reflected by the information layer is detected by a detector of a usual type, e.g., a four-quadrant diode, in the head 22 for generating a read signal and further detector signals, including a tracking error and a focusing error signal for controlling said tracking and focusing actuators. The read signal is processed by read processing unit 30 of a usual type, including a demodulator, deformatter and output unit to retrieve the information. Hence, retrieving means for reading information includes the drive unit 21, the head 22, the positioning unit 25 and the read processing unit 30. The device comprises write processing means for processing the input information to generate a write signal to drive the head 22, the write processing means comprising an input unit 27, and modulator means comprising a formatter 28 and a modulator 29. The control unit 20 controls the recording and retrieving of information and may be arranged for receiving commands from a user or from a host computer. The control unit 20 is connected via control lines 26, e.g., a system bus, to said input unit 27, formatter 28 and modulator 29, to the read processing unit 30, and to the drive unit 21, and the positioning unit 25. The control unit 20 comprises control circuitry, for example, a microprocessor, a program memory and control gates, for performing the procedures and functions according to the invention as described below with reference to FIGS. 3 to 24. The control unit 20 may also be implemented as a state machine in logic circuits. During the writing operation, marks representing the information are formed on the record carrier. The marks may be in any optically readable form, e.g., in the form of areas with a reflection coefficient different from their surroundings, obtained when recording in materials, such as dye, alloy or phase change material, or in the form of areas with a direction of magnetization different from their surroundings, obtained when recording in magneto-optical material writing and reading of information for recording on optical disks and usable formatting, error correcting and channel coding rules are well-known in the art, e.g., from the CD system. The marks can be formed by means of the radiation spot 23 generated on the recording layer via the beam 24 of electromagnetic radiation, usually from a laser diode. User information is presented on the input unit 27, which may comprise compression means for input signals, such as analog audio and/or video, or digital uncompressed audio/video. Suitable compression means is described for audio in WO 98/16014-A1, corresponding to U.S. Pat. Nos. 6,269,338 and 6,778,965 (PHN 16452), and for video in the MPEG2 standard. The input unit 27 processes the audio and/or video to units of information, which are passed to the formatter 28 for adding control data and formatting the data according to the recording format (as described below), e.g., by adding error correction codes (ECC) and/or interleaving. For computer applications, units of information may be interfaced to the formatter 28 directly. The formatted data from the output of the formatter 28 is passed to the modulation unit 29, which comprises, for example, a channel coder, for generating a modulated signal for driving the head 22. Further, the modulation unit 29 comprises synchronizing means for including synchronizing patterns in the modulated signal. The formatted units presented to the input of the modulation unit 29 comprise address information and are written to corresponding addressable locations on the record carrier under the control of control unit 20. The control unit 20 is arranged for recording and retrieving position data indicative of the position of the recorded information volumes. The device has session means comprising a mapping unit 31 coupled to the control unit 20 and detection means comprising a detection unit 32 coupled to the control unit 20 and the mapping unit 31. The mapping unit 31 has an output 33 coupled to the formatter 28 for writing session control blocks in the start zone of the current session as described below. The detection unit 32 has an input 34 coupled to the read unit 30 for detecting the session control blocks from the session start zone. The detection unit 32 is coupled to the mapping unit 31 for transferring data from detected session control blocks for generating new session control blocks including the existing data. The mapping unit 31 is arranged for determining volume data about the status and contents of the information volume, also called session, in particular, the start and end addresses of previously closed sessions and information about reserved areas in the session. First, a session is opened by writing an intro zone including the volume data in a session control block including session items (SES), then user data can be written by a number of writing commands, and, finally, the session is closed by filling all remaining blank areas and recording further session control blocks and a closure part at the end zone of that volume, as described below.

In an embodiment of the device, the mapping unit is arranged for recording previous session items in the session control block. A previous session item is included for each closed session as described below with reference to FIGS. 22 and 24.

A practical embodiment of the system for recording information according to the invention is as follows. The system specifies the mechanical, physical and optical characteristics of a 120 mm recordable optical discs with capacities of 4.7 Gbytes and 9.4 Gbytes. It specifies the quality of the recorded and unrecorded signals, the format of the data and the recording method, thereby allowing for information interchange by means of such discs. The data can be written once and read many times using a non-reversible method. These discs are identified as DVD+R. The track shape is as follows. The recordable area, called the Information Zone, shall contain tracks formed from a single spiral groove. Each track shall form a 360° turn of a continuous spiral. Recordings shall be made in the groove. The tracks in the Information Zone contain a phase modulated sinusoidal deviation from the nominal centerlines, called wobble, which contains addressing information called Address-in-Pre-groove or ADIP. The tracks shall be continuous in the Information Zone. The groove tracks shall start at a radius of 22.0 mm max. and end at a radius of 58.50 mm min. The track path shall be a continuous spiral from the inside (beginning of the Lead-in Zone) to the outside (end of the Lead-out Zone) when the disc rotates counter-clockwise as viewed from the optical head. The track pitch is the distance measured between the average track centerlines of adjacent tracks, measured in the radial direction. The track pitch shall be 0.74 µm±0.03 µm. The track pitch, averaged over the Information Zone, shall be 0.74 µm±0.01 µm. The wobble of the tracks is a sinusoidal deviation from the nominal centerlines, with a wavelength of 4.2656 mm±0.0450 mm (equivalent to 32 Channel bits). The Total Harmonic Distortion (THD) of the oscillator for generating the wobble sine wave shall be $\leq-40$ dB. The wobble is phase modulated by inverting wobble cycles. The information contained in the wobble modulation is called Address-in-Pre-groove or ADIP.

FIG. 3 shows the alignment of ADIP and information blocks. The information blocks 37 to be recorded onto the disc must be aligned with the ADIP information 39 modulated in the wobble 38. It is shown that 93 wobbles correspond to 2 Sync Frames, which are the start of an information block. Of each 93 wobbles, 8 wobbles are phase modulated with ADIP information. Further, 1 wobble equals 32 Channel bits (=32 T) and one ADIP unit=8 modulated wobbles per 2 Sync Frames.

Figure 4:
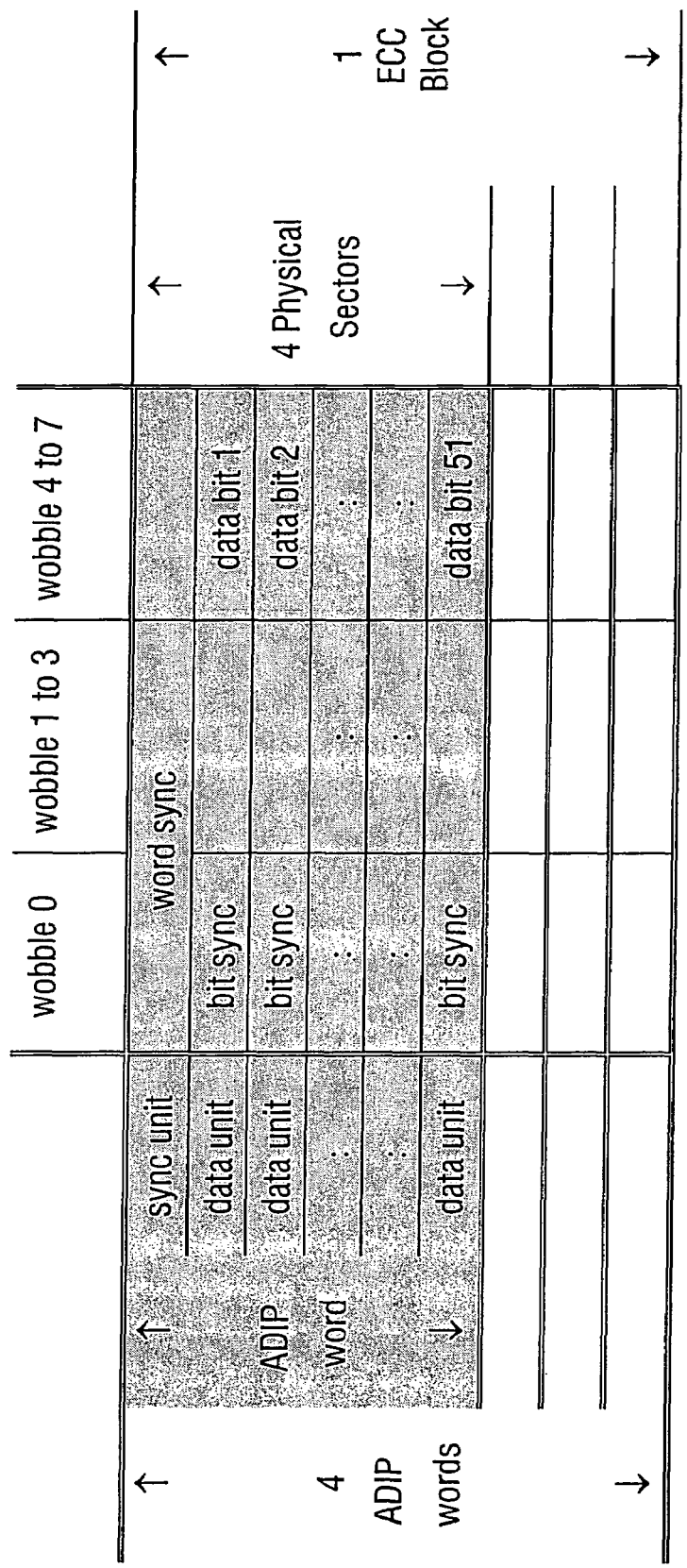
FIG. 4 shows the ADIP word structure.

FIG. 4 shows the ADIP word structure. 52 ADIP units are grouped into one ADIP word each. This means that one ADIP word corresponds to 4×13×2 Sync Frames=4 Physical Sectors. Each ADIP word consists of: 1 ADIP sync unit+51 ADIP data units. The ADIP sync unit=4 inverted wobbles for word sync+4 monotone wobbles. The ADIP data unit=1 inverted wobble for bit sync+3 monotone wobbles+4 wobbles representing one data bit. (see 0) The information contained in the data bits of an ADIP word is as follows:

bit 1: this bit is reserved and shall be set to ZERO.

bit 2 to 23: these 22 bits contain a Physical Address. Data bit 2 is the most significant bit (MSB) and data bit 23 is the least significant bit (LSB). The addresses increase by one for each next ADIP word. The first address in the Information Zone shall be such that Physical Address (00C000) is located at radius $24.0_{-0.2}^{+0.0}$ mm.

bit 24 to 31: these 8 bits contain auxiliary information about the disc, e.g., recording control information. In the Data Zone and the Lead-out Zone of the disc, the auxiliary bytes shall be set to (00). In the Lead-in Zone of the disc the auxiliary bytes shall be used as follows:

Bit 24 to 31: from 256 consecutive ADIP words shall form one ADIP Aux Frame with 256 bytes of information. The first byte of each ADIP Aux Frame shall be located in an ADIP word with a Physical Address that is a multiple of 256 (Physical Address=(xxxx00)). The contents of the 256 bytes are defined in FIG. 7.

bit 32 to 51: these 20 bits contain error correction parities for the ADIP information.

FIG. 5 shows the ADIP error correction structure. For the ADIP error correction, the ADIP data bits are grouped into 4-bit nibbles. The mapping of the data bits into the nibble array is defined in FIG. 5. Bit 0 is a dummy bit, which shall be considered as set to ZERO for the error corrector.

A nibble-based RS (13,8,6) code is constructed, of which the 5 parity nibbles N8 to N12, are defined by the remainder polynomial R(x):

$$R(x) = \sum_{i=8}^{12} N_i x^{12-i}$$
$$= I(x) x^5 \bmod G_{PA}(x)$$

where $$I(x) = \sum_{i=0}^{7} N_i x^{7-i}$$

$$G_{PA}(x) = \prod_{k=0}^{4} (x + \alpha^k)$$

α is the primitive root 0010 of the primitive polynomial $P(x)=x^4+x+1$.

All bits of the 5 parity nibbles $N_8$ to $N_{12}$ shall be inverted before recording.

Figure 6A:
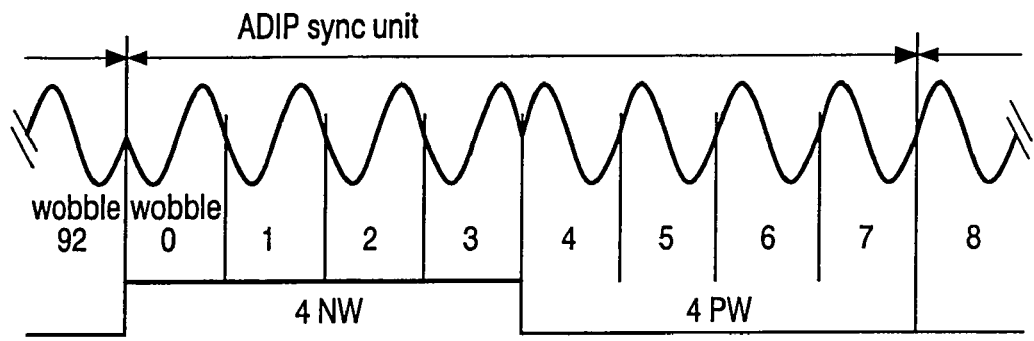
FIGS. 6a-6c show the ADIP modulation rules.
Figure 6B:
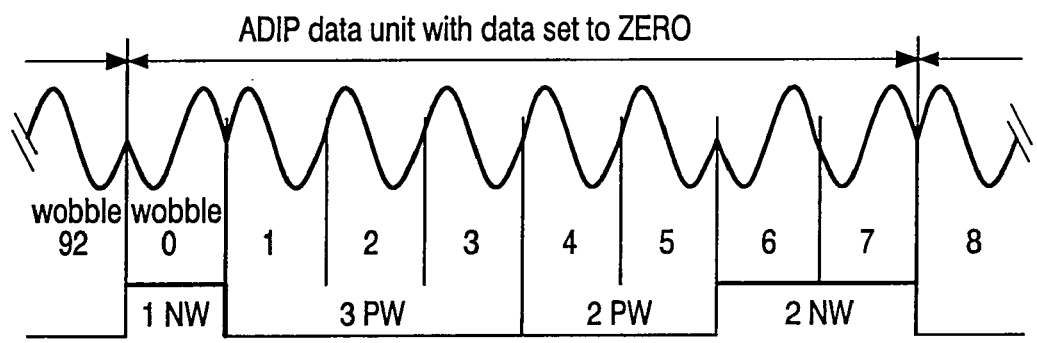
Figure 6C:
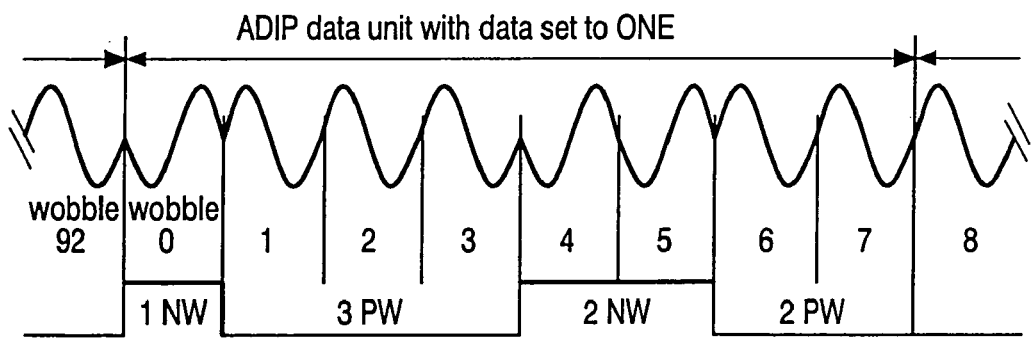

FIGS. 6a-6c show the ADIP modulation rules. The ADIP units are modulated by inverting some of the 8 wobble cycles. FIG. 6a shows Modulation of the ADIP word sync, FIG. 6b shows Modulation of an ADIP ZERO bit, and FIG. 6c shows Modulation of an ADIP ONE bit, wherein:

PW is a positive wobble, which starts moving towards the inside of the disc.

NW is a negative wobble, which starts moving towards the outside of the disc.

all monotone wobbles are indicated as PWs.

FIG. 7 shows a table of Physical disc information. The Physical disc information is encoded in ADIP as described above. This information shall comprise the 256 bytes shown in FIG. 7. It contains disc information and values used for the Optimum Power Control (OPC) algorithm to determine optimum laser power levels for writing. The information is copied into a recordable zone, called the Control Data, during initialization of the disc. The data contents are:

Byte 0—Disc Category and Version Number

Bits b7 to b4 shall specify the Disc Category,
they shall be set to 1010, indicating a DVD+R disc.

Bits b3 to b0 shall specify the Version Number,
they shall be set to 0000 indicating the version Byte 1—Disc Size and maximum transfer rate Bits b7 to b4 shall specify the disc size,
they shall be set to 0000, indicating a 120 mm disc Bits b3 to b0 shall specify the maximum read transfer rate,
they shall be set to 1111 indicating no maximum read transfer rate is specified Byte 2—Disc structure Bit b7 to b4 shall be set to 0000

Bits b3 to b0 shall specify the type of the recording layer(s):
they shall be set to 0010, indicating a write-once recording layer.

Byte 3—Recording density

Bits b7 to b4 shall specify the average Channel bit length in the Information Zone,
they shall be set to 0000, indicating 0.133 μm Bits b3 to b0 shall specify the average track pitch,
they shall be set to 0000, indicating an average track pitch of 0.74 μm Bytes 4 to 15—Data Zone allocation Byte 4 shall be set to (00).

Bytes 5 to 7 shall be set to (030000) to specify PSN (Physical Sector No.) 196,608 of the first Physical Sector of the Data Zone Byte 8 shall be set to (00).

Bytes 9 to 11 shall be set to (26053F) to specify PSN 2,491,711 as the last possible Physical Sector of the Data Zone.

Bytes 12 to 15 shall be set to (00)

Byte 16—(00) shall be set to (00).

Bytes 17 to 18 Reserved. These bytes are reserved and shall be set to (00).

Bytes 19 to 26 Disc Manufacturer ID. These 8 bytes shall identify the manufacturer of the disc. Trailing bytes not used shall be set to (00).

Bytes 27 to 29—Media type ID. Disc manufacturers can have different types of media, which shall be specified by these 3 bytes. The specific type of disc is denoted in this field.

Byte 30—Product revision number. This byte shall identify the product revision number in binary notation. All discs with the same Disc Manufacturer ID and the same Product ID, regardless of Product revision numbers, must have the same recording properties (only minor differences are allowed: Product revision numbers shall be irrelevant for recorders). If not used, this byte shall be set to (00)

Byte 31 number of Physical format information bytes in use. This byte forms one 8 bit binary number indicating the number of bytes actually in use for Physical format information. It shall be set to (36) indicating that only the first 54 bytes of the Physical format information are used.

Byte 32—Reference recording velocity. This byte indicates the lowest possible recording velocity of the disc, which is also referred to as the Reference velocity, as a number n such that $n=10 \times v_{ref}$ (n rounded off to an integral value) It shall be set to (23) indicating a Reference writing speed of 3.49 m/s.

Byte 33—Maximum recording velocity. This byte indicates the highest possible recording velocity of the disc, as a number n such that $n=10 \times v_{ref}$ (n rounded off to an integral value) It shall be set to (54) indicating a maximum writing speed of 8.44 m/s.

Byte 34 Wavelength $\lambda_{IND}$. This byte shall specify the wavelength in nanometers of the laser with which the optimum write parameters in the following bytes have been determined, as a number n such that n=Wavelength−600

Byte 35 Reserved

Byte 36 Maximum read power, Pr at reference velocity.
This byte shall specify the maximum read power Pr in milliwatts at the reference velocity as a number n such that
$n=20 \times (Pr-0.7)$ Byte 37 $P_{IND}$ at reference velocity. $P_{IND}$ is the starting value for the determination of Ppo used in the OPC algorithm. This byte shall specify the indicative value $P_{IND}$ of Ppo in milliwatts at the reference velocity as a number n such that
$n=20 \times (P_{IND}-5)$ Byte 38 $\beta_{target}$ at reference velocity. This byte shall specify the target value for $\beta$, $\beta_{target}$ at the reference velocity used in the OPC algorithm as a number n such that
$n=10 \times \beta_{target}$ Byte 39 Maximum read power, Pr at maximum velocity.
This byte shall specify the maximum read power Pr in milliwatts at the maximum velocity as a number n such that
$n=20 \times (Pr-0.7)$ Byte 40 $P_{IND}$ at maximum velocity. $P_{IND}$ is the starting value for the determination of Ppo used in the OPC algorithm. This byte shall specify the indicative value $P_{IND}$ of Ppo in milliwatts at the maximum velocity as a number n such that
$n=20 \times (P_{IND}-5)$ Byte 41 $\beta_{target}$ at maximum velocity. This byte shall specify the target value for $\beta$, $\beta_{target}$ at the maximum velocity used in the OPC algorithm as a number n such that
$n=10 \times \beta_{target}$ Byte 42 $T_{top}$ ($\geq 4$) first pulse duration for current mark $\geq 4$ at reference velocity.
This byte shall specify the duration of the first pulse of the multi-pulse train when the current mark is a 4 T or greater mark for recording at reference velocity. The value is expressed in fractions of the channel bit clock period as a number n such that
$n=16 \times T_{top}/T_W$ and $4 \leq n \leq 40$ Byte 43 $T_{top}$ (=3) first pulse duration for current mark =3 at reference velocity. This byte shall specify the duration of the first pulse of the multi-pulse train when the current mark is a 3 T mark for recording at reference velocity. The value is expressed in fractions of the channel bit clock period as a number n such that
$n=16 \times T_{top}/T_W$ and $4 \leq n \leq 40$ Byte 44 $T_{mp}$ multi-pulse duration at reference velocity.
This byte shall specify the duration of the 2nd pulse through the 2nd to last pulse of the multi-pulse train for recording at reference velocity.
The value is expressed in fractions of the channel bit clock period as a number n such that
$n=16 \times T_{mp}/T_W$ and $4 \leq n \leq 16$ Byte 45 $T_{lp}$ last pulse duration at reference velocity.
This byte shall specify the duration of the last pulse of the multi-pulse train for recording at reference velocity. The value is expressed in fractions of the channel bit clock period as a number n such that
$n=16 \times T_{lp}/T_W$ and $4 \leq n \leq 24$ Byte 46 $dT_{top}$ first pulse lead time at reference velocity.
This byte shall specify the lead time of the first pulse of the multi-pulse train relative to the trailing edge of the second channel bit of the data pulse for recording at reference velocity. The value is expressed in fractions of the channel bit clock period as a number n such that
$16 \times dT_{top}/T_W$ and $4 \leq n \leq 24$ Byte 47 $dT_{le}$ 1st pulse leading edge correction for previous space=3 at reference velocity. Bit 7 to bit 4 of this byte shall specify the leading edge correction for the 1st pulse of the multi-pulse train when the previous space was a 3 T space for recording at reference velocity. The value is expressed in fractions of the channel bit clock period according to FIG. 8.

Byte 48 $T_{top}$ ($\geq 24$) first pulse duration for current mark $\geq 24$ at maximum velocity. This byte shall specify the duration of the first pulse of the multi-pulse train when the current mark is a 4 T or greater mark for recording at maximum velocity. The value is expressed in fractions of the channel bit clock period as a number n such that
$n=16 \times T_{top}/T_W$ and $4 \leq n \leq 40$ Byte 49 $T_{top}$ (3) first pulse duration for current mark=3 at maximum velocity. This byte shall specify the duration of the first pulse of the multi-pulse train when the current mark is a 3 T mark for recording at maximum velocity. The value is expressed in fractions of the channel bit clock period as a number n such that
$n=16 \times T_{top}/T_W$ and $4 \leq n \leq 40$ Byte 50 $T_{mp}$ multi pulse duration at maximum velocity. This byte shall specify the duration of the 2nd pulse through the 2nd to last pulse of the multi-pulse train for recording at maximum velocity. The value is expressed in fractions of the channel bit clock period as a number n such that
$n=16 \times T_{mp}/T_W$ and $4 \leq n \leq 16$ Byte 51 $T_{lp}$ last pulse duration at maximum velocity. This byte shall specify the duration of the last pulse of the multi-pulse train for recording at maximum velocity. The value is expressed in fractions of the channel bit clock period as a number n such that
$n=16 \times T_{lp}/T_W$ and $4 \leq n \leq 24$ Byte 52 $dT_{top}$ first pulse lead time at maximum velocity.
This byte shall specify the lead time of the first pulse of the multi-pulse train relative to the trailing edge of the second channel bit of the data pulse for recording at maximum velocity.
The value is expressed in fractions of the channel bit clock period as a number n such that
$n=16 \times dT_{top}/T_W$ and $4 \leq n \leq 24$ Byte 53 $dT_{le}$ first pulse leading edge correction for previous space=3 at maximum velocity. Bit 7 to bit 4 of this byte shall specify the leading edge correction for the 1st pulse of the multi-pulse train when the previous space was a 3 T space for recording at maximum velocity. The value is expressed in fractions of the channel bit clock period according to FIG. 8.

Bytes 54 to 255 Reserved—All (00). These bytes shall be set to all (00).

FIG. 8 shows leading edge correction times. The parameter is called $dT_{le}$ and is described above with FIG. 7 in byte 47. Bit 3 to bit 0 of this byte shall be set to 0000. Bit combinations not specified shall not be used.

Figure 9:
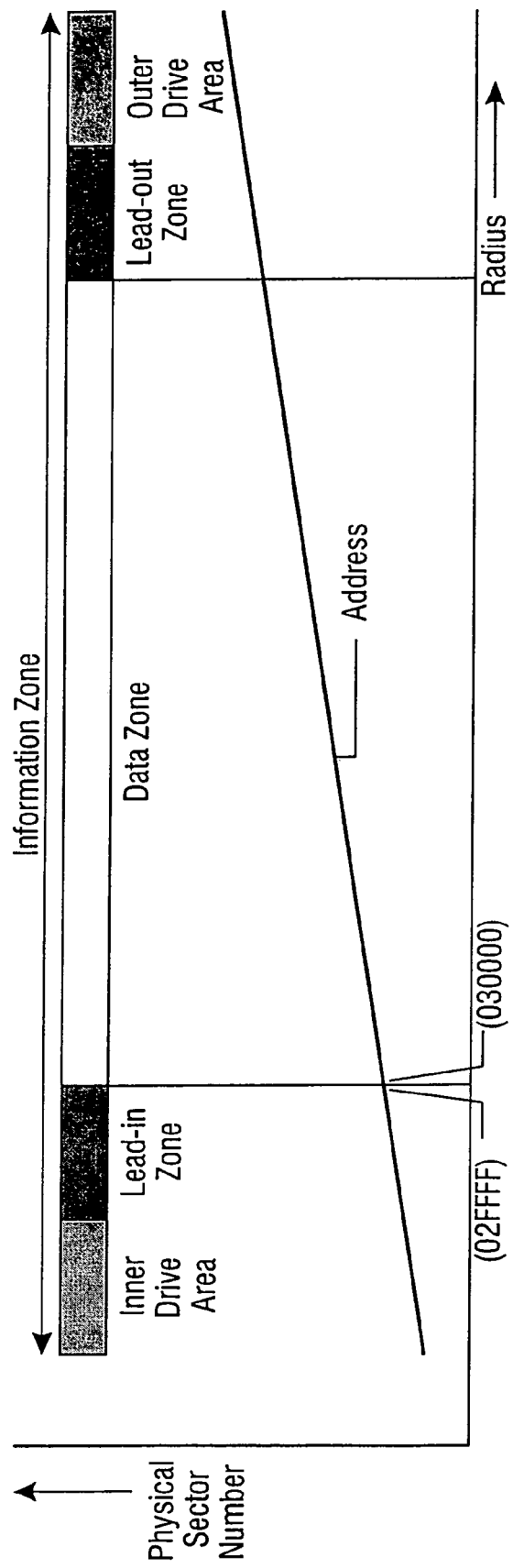
FIG. 9 shows the record carrier sector numbering.

FIG. 9 shows the record carrier sector numbering. The recordable area is called information zone. The Information Zone shall contain all information on the disc relevant for data interchange. The Information Zone may contain one or more sessions. Each session shall be divided in three parts: a Lead-in/Intro Zone, a Data Zone and a Lead-out/Closure Zone. In double-sided discs, there is one Information Zone per side. The Data Zones are intended for the recording of User Data. The Lead-in Zone contains control information. The Lead-out Zone allows for a continuous smooth lead-out and also contains control information. The Inner and Outer Drive Areas are meant for disc testing. A description is given for a Single-session disc. In such a disc, the Lead-in Zone, the Data Zone and the Lead-out Zone constitute the recordable area in which the information is recorded using a non-reversible effect. The layout of a Multi-session disc is defined later.

FIG. 10 shows a layout of a recorded single-session disc. The Information Zone of single-sided and of each side of double-sided discs are sub-divided in an Inner drive area, a Lead-In, a Data zone, a Lead-Out area and an Outer Drive area. The radii are indicated for the Zones by nominal values of the center of the first (or last) track of the Zone. Physical Sector Numbers (PSNs) are shown for the first Physical Sector of the each Zone. The Data zone shall have a first PSN (030000). The PSNs increase by 1 for each next Physical Sector in the whole Information Zone.

FIG. 11 shows the Inner Drive Area. The Inner Drive Area is the innermost zone of the disc which is used by the drive for performing disc tests and OPC algorithms. The Physical Sector Number of the first and last Physical Sector of each part is indicated in hexadecimal and decimal notation, and the number of Physical Sectors in each part are indicated in decimal notation. The following subdivision is shown:

Initial Zone: This Zone shall remain blank.
Inner Disc Test Zone: 16384 Physical Sectors reserved for drive testing and OPC.
Inner Disc Count Zone: 4096 Physical Sectors reserved for counting the number of OPC algorithms performed in the Inner Disc Test Zone. Whenever an ECC Block or part of it in the Inner Disc Test Zone has been recorded, the ECC Block shall be flagged by recording 4 Physical Sectors in the Inner Disc Count Zone.
Inner Disc Administration Zone: 4096 Physical Sectors to be used for optional drive specific information. The first 16 physical sectors of this Zone shall be filled with all Main Data set to (00). The Inner Disc Administration Zone contains drive information, e.g., a drive identification (Drive ID) and data as defined by the drive manufacturer.
Session map Zone: 4096 Physical Sectors to store information about the locations of Sessions and recordings on the disc. The first 16 physical sectors of this Zone shall be filled with all Main Data set to (00). This Zone consists of 2 parts:
part 1: consists of 191 ECC Blocks called Session Map blocks (SEM) to be used to store the locations of all Closed Sessions,
part 2: consists of 1024 Physical Sectors, grouped in units of 4 sectors, where each unit corresponds to one ADIP word. These units shall be used as Recorded Area Indicators.

FIG. 12 shows a format of a Session Map block (SEM). Whenever a Session is closed, the next ECC Block in the Session map Zone, immediately following the last SEM, shall be recorded with the locations of all Closed Sessions. The first ECC Block in the Session map Zone has to be used as a run-in for the second ECC Block. If all 191 blocks have been used, additional Sessions still can be added, however, the drive will have to apply a search procedure to find the additional Sessions. FIG. 12 shows the following contents for the SEM for each physical sector:

Physical Sector 0/bytes D0 to D3—Content Descriptor. These bytes identify the Session DCB and shall be set to (544F4300), representing the characters "SDC" and the version number 0.
Physical Sector 0/byte D4 to D7—Reserved. To be set to (00)
Physical Sector 0/byte D8 to D39—Drive ID. These bytes shall contain the drive ID.
Physical Sector 0/byte D40 to D63—Reserved. To be set to (00)
Physical Sector 0/byte D64 to D2047—Session items. These bytes are grouped in units of 16 bytes each. Each unit of 16 bytes can contain a Session item according to FIG. 13. All unused bytes shall be set to (00).

FIG. 13 shows a session item. The Session Map block (SEM) shall contain a Session item for each Closed Session on the disc. The Session items shall be ordered with increasing numbers and addresses, as follows:

byte B0 to B2: these 3 bytes identify the item type and shall be set to (53,53,4E), representing the characters "SSN".
byte B3: this byte shall specify the sequence number of the Session specified in this item.
byte B4 to B7: these 4 bytes shall specify the PSN of the first Physical Sector in the Data Zone of the Session specified in this item.
byte B8 to B11: these 4 bytes shall specify the PSN of the last Physical Sector in the Data Zone of the Session specified in this item.
byte B12 to B15: these 4 bytes are reserved and shall be set to (00).

Figure 14:
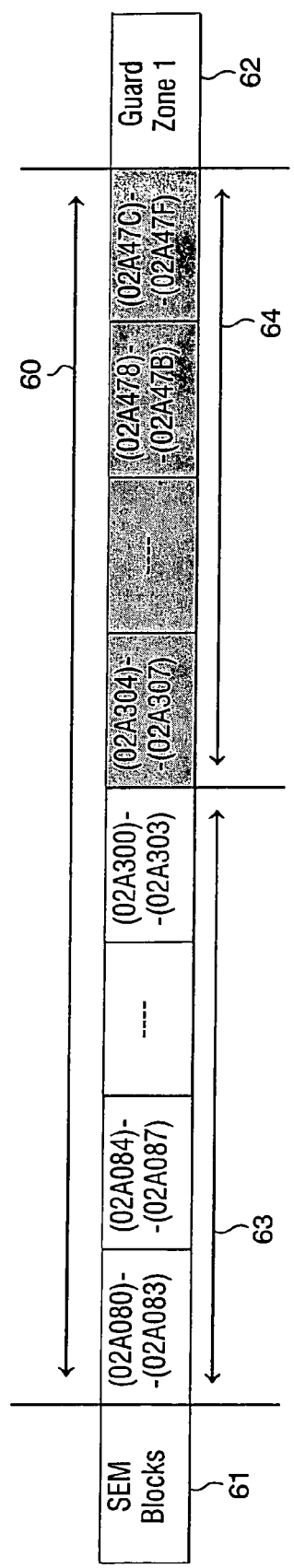
FIG. 14 shows Recorded Area Indicators.

FIG. 14 shows Recorded Area Indicators. The last part of the SEM zone for recording SEM blocks 61 is shown schematically. A mapping area 60 is located at the end of the SEM zone. The next zone, i.e., the Guard zone 62, is shown at the right end. The mapping area is recorded starting at the highest address. A recorded part 64 indicates the recorded regions of the recordable area, and the unrecorded part 63 indicates unrecorded regions. To speed up the access of the disc, the recorder needs to know in which region of the disc the last written ECC Block can be found. For this purpose, the mapping area is defined, based on recorded areas with the size of 4 Physical Sectors, each area corresponding to one ADIP word. These areas shall be recorded with random EFM signals. No gaps are allowed between recorded ADIP words. 1024 Physical Sectors have been reserved for this purpose, allowing to divide the disc into maximum 256 regions. The Recorded Area Indicators shall be used from the outer side of the SEM Zone towards the inner side of the SEM Zone. By means of an "HF detection", the recorder can find the location of the start of the Recorded Area Indicators and determine the region in which the last recorded ECC Block can be found. Each region of 640 ECC Blocks, between PSN=(030000) and PSN=(26053F), corresponds to one Recorded Area Indicator. All regions up to and including the last recorded ECC Block shall be indicated by their Recorded Area Indicator. In mathematical form: if the first Recorded Area Indicator is composed of the Physical Sectors with PSNRAI to PSNRAI+3, then the last recorded ECC Block can be found between:
PSN={(02A47C)−(PSNRAI)}×(A0)+(030000) and
PSN={(02A47C)−(PSNRAI)}×(A0)+(030280), or in decimal notation:
PSN={173180−PSNRAI}×160+196608 and
PSN={173180−PSNRAI}×160+197248

FIG. 15 shows the Lead-in Zone. The Lead-in Zone is located at the inner side of the Information Zone. A maiden disc does not have any data recorded in the Lead-in Zone. After finalization of the disc or closing of the first Session, the Lead-in Zone shall be recorded as described below. FIG. 15 shows the zones and the addresses, as follows (notation like in FIG. 11):

Guard Zone 1: The Guard Zone is used to create a minimum amount of Lead-in Zone required for compatibility. This zone shall contain 14.848 Physical Sectors, all filled with Main Data set to (00).

Reserved Zone 1: 4096 Physical Sectors are reserved and shall be set (00).

Reserved Zone 2: 64 Physical Sectors are reserved and shall be set (00).

Inner Disc Identification Zone: 256 Physical Sectors reserved for information agreed upon by the data interchange parties. Each set of 16 Physical Sectors from one ECC Block is either a Disc Control Block (DCB) or recorded with all (00) Main Data. Each ECC Block in this Zone following one recorded with all (00) Main Data shall also be recorded with all (00) Main Data.

Reserved Zone 3: 64 Physical Sectors are reserved and shall be set (00).

Reference Code Zone: The recorded Reference Code Zone shall consist of the 32 Physical Sectors from two ECC Blocks which generate a specific Channel bit pattern on the disc. This shall be achieved by setting to (AC) all 2048 Main Data bytes of each corresponding Data Frame. Moreover, no scrambling shall be applied to these Data Frames, except to the first 160 Main Data bytes of the first Data Frame of each ECC Block.

Buffer Zone 1: This Zone shall consist of 480 Physical Sectors from 30 ECC Blocks. The Main Data of the Data Frames in this Zone shall be set to all (00).

Control Data Zone: This Zone shall consist of 3072 Physical Sectors from 192 ECC Blocks. The content of the 16 Physical Sectors of each ECC Block is repeated 192 times.

Buffer Zone 2: This recorded Zone shall consist of 512 Physical Sectors from 32 ECC Blocks. The Main Data of the Data Frames in this Zone shall be set to all (00).

FIG. 16 shows the structure of a Control Data Block. The first 2048 bytes constitute Physical format information, of which the contents are given in FIG. 7. The next 2048 bytes constitute Disc Manufacturing information. The last 14×2048 bytes are available for Content Provider Information. In an embodiment of the device the 28,672 bytes of Content Provider Information are set to zero (00). Data received from a host is blocked and not recorded in this field. This prevents data of a confidential nature, for example, decryption keys for decoding video of a DVD video disc, to be recorded here. The Physical format information contains disc and format information. The information in bytes 0 to 255 shall be copied from the ADIP auxiliary data during finalization of the disc or closing of the first Session, and shall reflect the actual status of the disc or first Session (e.g., the actual end of the Data Zone). All 256 bytes have the same definitions and contents as the Physical Disc information defined in FIG. 7, except the following bytes:

Byte 0—Disc Category and Version Number
Bits b7 to b4 shall specify the Disc Category indicating a DVD+R disc.
Bits b3 to b0 shall specify the Version Number of the System Description Byte 1—Disc size and maximum transfer rate
Bits b7 to b4 shall specify the disc size, they shall be set to 0000, indicating a 120 mm disc
Bits b3 to b0 shall specify the maximum read transfer rate. These bits may be set to one of the following values, depending on the maximum read-out speed needed by the application:
0000: a maximum transfer rate of 2.52 Mbits/s
0001: a maximum transfer rate of 5.04 Mbits/s
0010: a maximum transfer rate of 10.08 Mbits/s
1111: no maximum transfer rate is specified.
All other combinations are reserved and shall not be used.

Byte 2—Disc structure
Bit b7 to b4 shall be set to 0000
Bits b3 to b0 shall specify the type of the recording layer(s): they shall be set to 0010, indicating a write-once recording layer.

Bytes 4 to 15—Data Zone allocation
Byte 4 shall be set to (00).
Bytes 5 to 7 shall be set to (030000) to specify PSN 196.608 of the first Physical Sector of the Data Zone
Byte 8 shall be set to (00).
Bytes 9 to 11 shall specify the Sector Number of the last Physical Sector of the Data Zone of the first Session.
Bytes 12 to 15 shall be set to (00)
Bytes 256 to 2 047—Reserved. These remaining bytes have no relation to the ADIP information and shall be set to zero (00).

Figure 17:
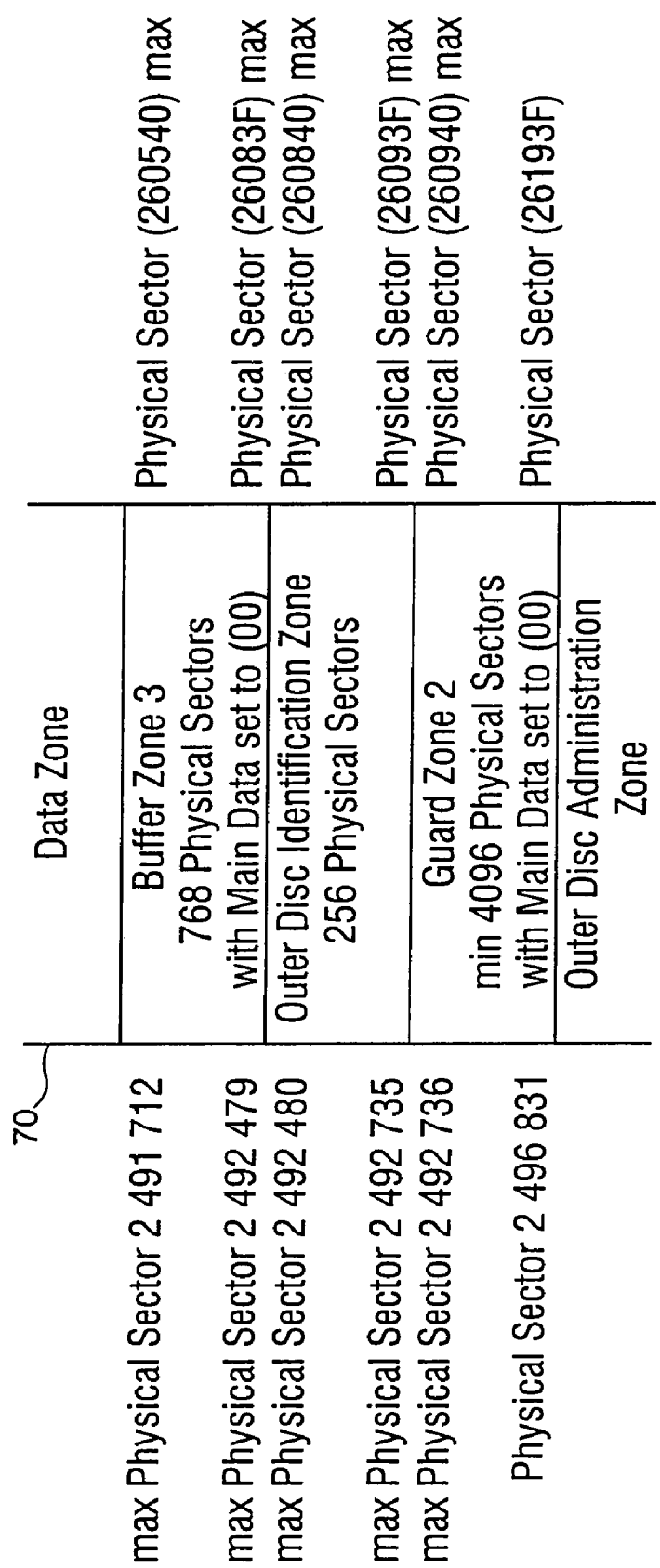
FIG. 17 shows the Lead-Out zone.

FIG. 17 shows the Lead-Out zone. At the top, the data zone 70 for recording user data is shown. The data zone has 2,295,104 Physical Sectors of user data area. The start radius of the Data Zone is determined by the location of ADIP Physical Address (00C000). After the Data zone follows the Lead-out Zone. The Lead-out Zone is located at the outer side of the Information Zone. FIG. 17 shows the following parts:

Buffer Zone 3: This recorded Zone shall consist of 768 Physical Sectors. The last possible start location of Buffer Zone 3 is (260540). The Main Data of the Data Frames in this Zone shall be set to all (00).

Outer Disc Identification Zone: 256 Physical Sectors reserved for information agreed upon by the data interchange parties. Each set of 16 Physical Sectors from one ECC Block is either a Disc Control Block (DCB) or recorded with all (00) Main Data. The contents of this Zone shall be equivalent to the contents of the last Inner Session Identification Zone (or to the contents of the Inner Disc Identification Zone in case of a Single-session disc).

Guard Zone 2: This Guard Zone is used as a protection for separating test writing zones from information zones containing user data. This Zone shall be filled with Main Data set to (00). This zone shall contain a minimum of 4096 Physical Sectors.

Outer Drive Area: The Outer Drive Area is the outermost zone of the disc which is used by the drive for performing disc tests and OPC algorithms.

FIG. 18 shows the Outer Drive Area, starting at the Guard zone 2. Then, the following parts are shown:

Outer Disc Administration Zone: 4096 Physical Sectors to be used for optional drive specific information. The first 16 physical sectors of this Zone shall be filled with all Main Data set to (00). This zone can be used in the same way as the Inner Disc Administration Zone (see 0).

Outer Disc Count Zone: 4096 Physical Sectors reserved for counting the number of OPC algorithms performed in the Outer Disc Test Zone.

Outer Disc Test Zone: 16384 Physical Sectors reserved for drive testing and OPC algorithms. Whenever an ECC Block or part of it in the Outer Disc Test Zone has been recorded, the ECC Block shall be flagged by recording 4 Physical Sectors in the Outer Disc Count Zone.

Guard Zone 3: This Zone shall remain blank.

FIG. 19 shows the layout of the Information Zone of a Multi-session disc. There can exist more than one session on the disc; session 1, session 2 and the last session N are shown. A session with an Intro and a Closure is called a Closed Session. The first Session shall be preceded by a Lead-in Zone instead of an Intro Zone, the final Session shall be followed by a Lead-out Zone instead of a Closure Zone. Once a Lead-out Zone has been recorded, the disc is called "finalized" and no additional recordings to the disc shall be allowed. A session without an Intro and a Closure is called an Open Session. All sessions must be Closed Sessions, except for the last one, which is allowed to be an Open Session. User Data can only be appended to an Open Session. If all session are closed, a new Open Session can be added. The first Closed Session on the disc shall have a Lead-in as described with FIG. 15. Subsequent Closed Sessions shall have an Intro as defined below. Every Closed Session shall have a Closure as defined below, except for the Final Session, which shall have a Lead out as described with reference to FIG. 17.

Each new Session that occurs after the first Session starting at PSN 30000, shall start with an Intro Zone. The Intro Zone consists of a Buffer Zone A, an Inner Session Identification Zone, a Session Control Data Zone and a Buffer Zone B. All Physical Sectors in the Intro Zone shall have bits b27 to b26 of the Data Frame set to ZERO ZERO, identifying the Intro Zone as if it was a Data Zone as described with reference to FIG. 9. The Buffer Zone A consists of 64 Physical Sectors which shall be set (00). The Inner Session Identification Zone consists of 256 Physical Sectors reserved for information agreed upon by the data interchange parties. Each set of 16 Physical Sectors from one ECC Block is either a Disc Control Block (DCB) (see FIG. 21) or recorded with all (00) Main Data. Each ECC Block in this Zone following one recorded with all (00) Main Data, shall also be recorded with all (00) Main Data. The Session Control Data Zone consists of 640 Physical Sectors from 40 ECC Blocks. The content of the 16 Physical Sectors of each ECC Block is repeated 40 times. The structure of a Control Data Block shall be as shown in FIG. 16. Finally, Buffer Zone B consists of 64 Physical Sectors which shall be set (00).

Each Session shall end with a Closure Zone consisting of two parts: a Buffer Zone C and an Outer Session Identification Zone. All Physical Sectors in the Closure Zone shall have bits b27 to b26 of the Data Frame set to ZERO ZERO, identifying the Closure Zone as if it was a Data Zone. The Buffer Zone C consists of 768 Physical Sectors which shall be set (00). The Outer Session Identification Zone consists of 256 Physical Sectors reserved for information agreed upon by the data interchange parties. Each set of 16 Physical Sectors from one ECC Block is either a Disc Control Block (DCB) (see FIG. 21) or recorded with all (00) Main Data. The contents of this Zone shall be equivalent to the contents of the last Inner Identification Zone.

Write once type record carriers, according to the invention, e.g., DVD+R discs, shall be recorded sequentially from the inner side of the disc towards the outer side of the disc. Compatibility with Read-Only devices can only be attained when the disc has a Lead-in Zone, all Session have been closed and there are no blank areas between the start of the Lead-in Zone and the end of the last Closure or Lead-out Zone.

FIG. 20 shows details of opened Session n. New data can be added to the disc by appending data to an Open Session. If all Sessions have been closed, a new Session shall be opened. A new Session is opened by recording Buffer Zone A and an SDCB (Session Disc Control Bloc, see FIG. 22) in the first ECC Block of the Inner Session Identification Zone. Additionally, Buffer Zone B of the Intro shall be recorded. The first Session on a blank disc is opened by recording Reserved Zone 2 plus an SDCB in the first ECC Block of the Inner Disc Identification Zone, and additionally, Buffer Zone 2 of the Lead-in Zone in case of the first Session on a blank disc shall be recorded. User Data added to the Data Zone shall be linked immediately to previously written User Data in the Data Zone, or to previously written data in one of the Reserved Areas. If a recorded area is preceded by a Reserved Area, an additional ECC Block is needed as a run-in for the first ECC Block of the recorded area. The additional ECC Block has to be considered as being part of the recorded area, and, hence, does not belong to the preceding Reserved Area.

When no more user data needs to be recorded, the session may be closed. When compatibility with DVD-RO devices is desired, all Sessions on the disc shall be closed. A Session is closed by recording all remaining parts in the Lead-in/ Intro Zone and adding the Closure Zone. In the Lead-in Zone or Intro Zone the Control Data Zone is to be recorded. In each Intro, the Session Control Data Zone shall be recorded with 40 ECC Blocks according to the format as described above with reference to FIG. 15 with the following settings for the Physical Format Information:

Byte 0—Disc Category and Version Number
  Bits b7 to b4 shall specify the Disc Category,
    they shall be set to a predefined value, indicating a DVD+R disc.
  Bits b3 to b0 shall specify the Version Number,
    they shall be set to a predefined value, indicating the version of the standard.
Byte 1—Disc size and maximum transfer rate
  Bits b7 to b4 shall specify the disc size,
    they shall be set to 0000, indicating a 120 mm disc
  Bits b3 to b0 shall specify the maximum read transfer rate.
    These bits may be set to one of the following values (depending on the maximum read-out speed needed by the application):
    0000: they specify a maximum transfer rate of 2.52 Mbits/s
    0001: they specify a maximum transfer rate of 5.04 Mbits/s
    0010: they specify a maximum transfer rate of 10.08 Mbits/s
    1111: they specify no maximum transfer rate is specified.
    All other combinations are reserved and shall not be used.
Byte 2—Disc structure
  Bit b7 to b4 shall be set to 0000
  Bits b3 to b0 shall specify the type of the recording layer(s):
    they shall be set to 0010, indicating a write-once recording layer.

Byte 3—Recording density
   Bits b7 to b4 shall specify the average Channel bit length in the Information Zone,
   they shall be set to 0000, indicating 0.133 µm
   Bits b3 to b0 shall specify the average track pitch, they shall be set to 0000, indicating an average track pitch of 0.74 µm
Bytes 4 to 15—Data Zone allocation
   Byte 4 shall be set to (00).
   Bytes 5 to 7 shall specify the Sector Number of the first Physical Sector of the Data Zone of the current Session
   Byte 8 shall be set to (00).
   Bytes 9 to 11 shall specify the Sector Number of the last Physical Sector of the Data Zone of the current Session.
   Bytes 12 to 15 shall be set to (00)
Bytes 16 to 255—Reserved—All (00)
   These bytes shall not be copied from the ADIP information, but shall set to (00).
Bytes 256 to 2047—Reserved—All (00)
   These remaining bytes have no relation to the ADIP information and shall be set to all (00).

Disc manufacturing information and Content provider information as described above.

The Closure Zone is defined as follows. At closing a Session, Buffer Zone C shall be recorded together with the Outer Session Identification Zone.

When no more sessions are to be recorded the user can decide to finalize the disc. When the disc is being finalized, instead of a Closure Zone, a Lead-out Zone, as described above with reference to FIG. 17, shall be recorded. After finalizing the disc, adding data is no longer possible.

FIG. 21 shows the general format of a Disc Control Block. Disc Control ECC Blocks (DCBs) are provided as a structure on the disc to include additional information for interchange between the data interchange parties. DCBs are recorded in the Inner and Outer Identification Zones of the disc or the Session. All DCBs shall have the same format for the first 40 data bytes. A special DCB is defined to reflect the status of the Session(s). If a Disc Control Block has to be updated, a substitute DCB shall be written immediately following the last written DCB in the Inner Session Identification Zone. Once a Session has been closed, the DCBs can no longer be updated. The Main Data of each Disc Control Block is defined as follows (see FIG. 21):

Bytes D0 to D3—Content Descriptor
if set to (00000000) the DCB is unused. The Content Descriptor of all subsequent DCBs in this Inner or Outer Identification Zone shall be set to (00000000). All remaining bytes, D4 to D2047 of Physical Sector 0 and D0 to D2047 of Physical Sector 1 to 15 shall be set to (00).
if set to (53444300), this DCB is a Session DCB (SDCB) as defined below.
all other values for the Content Descriptor are reserved.

Each new DCB added to the Inner or the Outer Identification Block shall be written at the first available unwritten DCB location. Each DCB with a Content Descriptor not set to (00000000) in the Inner Identification Zone of a Session, shall have an identical DCB in the Outer Identification Zone in the respective Session. The order of the DCBs in the Inner Identification Zone shall be the same as the order in the Outer Identification Zone.

Bytes D4 to D7—Unknown Content Descriptor Actions
These bits are provided to specify required actions when the content and use of the DCB are unknown (i.e., the content descriptor is not set to a known assigned value). These bytes form a field consisting of 32 individual bits.

Bits b31 to b4 Reserved. These bits shall be set to all ZERO.
Bit b3 DCB rewrite, if set to ONE, substituting the current DCB shall not be allowed, else it shall be set to ZERO.
Bit b2 Formatting, if set to ONE, reformatting of the disc shall not be allowed or is not possible, else it shall be set to ZERO.
Bit b1 DCB read protect, if set to ONE, the information in this DCB is meant for use by the drive only and shall not be transferred outside the drive, else it shall be set ZERO.
Bit b0 Data Zone write, if set to ONE, recording shall not be allowed in the Data Zone, else it shall be set to ZERO.
Bytes D8 to D39 Drive ID
Bytes D8 to D39 shall contain a unique descriptor, identifying the drive that has written the DCB. The format of this unique drive identifier shall be as follows: bytes D8 to D23 shall identify the manufacturer of the drive. Bytes D24 to D35 shall identify the model name/type number of the drive. Bytes D36 to D39 shall contain a unique serial number of the drive. The 4 bytes shall form one 32-bit binary number.
Bytes D40 to D2047 Content Descriptor Specific. The bytes are specified by the description for the DCB with the actual Content Descriptor value.
Physical Sector 1 to 15: Bytes D0 to D2047 Content Descriptor Specific. The bytes are specified by the format description for the DCB with the actual Content Descriptor value.

FIG. 22 shows the Format of the Session Disc Control Block (SDCB). Both the Lead-in/Intro Zone and the Lead-out/Closure Zone of a Session shall contain an SDCB containing a Session map of the Session. The SDCB in the Inner and Outer Session Identification Zones shall be identical and have the content as follows:

Physical Sector 0/bytes D0 to D3—Content Descriptor. These bytes identify the Session DCB and shall be set to (53444300), representing the characters "SDC" and the version number 0.
Physical Sector 0/byte D4 to D7—Unknown Content Descriptor Actions. The bytes shall be set to (0000000D) indicating that if this DCB is not known to the system, the DCB shall not be substituted, the disc can not be reformatted, writing to the Data Zone shall not be allowed, while transferring the DCB information from the drive to the host computer is allowed.
Physical Sector 0/byte D8 to D39—Drive ID. These bytes shall contain the drive ID as specified above with FIG. 21, bytes D8 to D39.
Physical Sector 0/bytes D40 to D41—Session number. These bytes shall specify the sequence number of the Session to which the SDCB belongs. The first Session shall have sequence number 1 and each subsequent Session number shall be incremented by one.
Physical Sector 0/byte D42 to D63—Reserved. These bytes are reserved and shall be set to (00)
Physical Sector 0/bytes D64 to D95—Disc ID. In the SDCB in the Inner Disc Identification Zone in the Lead-in Zone of the first Session, these 32 bytes shall be recorded with a random, statistically unique, 256-bit binary number at initialization of the disc (opening of the first Session). In the SDCB in the Inner Session Identification Zone in the Intro of each next Session, bytes D64 to D95 shall be set to all (00).
Physical Sector 0/byte D96 to D127—Application dependent field. The field shall consist of 32 bytes and is reserved for use by the application to store information such as specific copy protection data. If this setting is not specified by the application, the bytes shall be set to (00). In each Session these bytes can be set independently.

Physical Sector 0/byte D128 to D2 047—Session items (SES). These bytes are grouped in units of 16 bytes each. Each unit of 16 bytes can contain one of two different types of SES items:

a Reserved Area item that specifies Reserved Areas in the current Session a Previous Session item that specifies the start and end addresses of previous Sessions.

All unused bytes shall be set to (00).

FIG. 23 shows a Reserved Area item. An SDCB can contain more than 1 Reserved Area item. If there are no Reserved Areas, there shall be no Reserved Area items. If a new Reserved Area has to be added to an existing Open Session, a new SDCB is written in the Inner Identification Zone of the current Session, immediately following the last SDCB. The last written SDCB in the Inner Identification Zone is the valid SDCB. Reserved Areas in a Session shall not be overlapping. The Reserved Area items shall be ordered with increasing addresses. FIG. 23 shows the layout of the Reserve Area item as follows:

byte B0 to B2: these 3 bytes identify the item type and shall be set to (525356), representing the characters "RSV".

byte B3: this byte shall specify the sequence number of the Reserved Area. The first Reserved Area in the Session shall have sequence number 1 and each subsequent Reserved Area number shall be incremented by one.

byte B4 to B7: these 4 bytes shall specify the PSN of the first Physical Sector belonging to the Reserved Area specified in this item.

byte B8 to B11: these 4 bytes shall specify the PSN of the last Physical Sector belonging to the Reserved Area specified in this item.

byte B12 to B15: these 4 bytes are reserved and shall be set to (00).

FIG. 24 shows a Previous Session item. An SDCB shall contain a Previous Session item for each Session preceding the current Session. The SDCB of the first Session shall not contain a Previous Session item. The Previous Session items shall be ordered with increasing addresses. FIG. 24 shows the layout of the Previous Session item as follows:

byte B0 to B2: these 3 bytes identify the item type and shall be set to (53534E), representing the characters "SSN".

byte B3: this byte shall specify the sequence number of the Previous Session specified in this item.

byte B4 to B7: these 4 bytes shall specify the PSN of the first Physical Sector in the Data Zone of the Previous Session specified in this item.

byte B8 to B11: these 4 bytes shall specify the PSN of the last Physical Sector in the Data Zone of the Previous Session specified in this item.

byte B12 to B15: these 4 bytes are reserved and shall be set to (00).

Although the invention has been explained mainly by embodiments using the DVD+R, similar embodiments are suitable for other optical recording systems. Also for the information carrier an optical disc has been described, but other media, such as a magnetic disc or tape, may be used. It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' may be represented by the same item of hardware. Further, the scope of the invention is not limited to the embodiments, and the invention lies in each and every novel feature or combination of features described above.

The invention claimed is:

1. A device for recording information in at least one information volume in a track in a recordable area on a record carrier, said at least one information volume comprising a start zone, a data zone and an end zone, said device comprising recording means for recording marks representing the information and control data constituting the information volume, and control means for controlling the recording and retrieving the information volume, characterized in that the control means comprises:

session means for opening a session by recording intro data, comprising a first buffer zone at the beginning of the start zone of the volume, and at least one session control block (SDCB), in a remaining blank area of the start zone after the buffer zone, the session control block (SDCB) comprising volume data indicative of the status and the contents of the session, and for closing the session for constituting the information volume by recording session control data indicating that the information volume is closed in the remaining blank area, and closure data after the last information recorded in the data zone for constituting the end zone of the volume; and detecting means for retrieving the session control block from said start zone, wherein the session control block comprises a drive identification indicating the device that has recorded that session control block.

2. A method of recording information in at least one information volume in a track in a recordable area on a record carrier, said at least one information volume comprising a start zone, a data zone and an end zone, said method comprising the step:

recording marks representing the information and control data constituting the information volume, characterized in that the method further comprises the steps:

opening a session by recording intro data comprising a first buffer zone at the beginning of the start zone of the volume, and at least one session control block (SDCB) in a remaining blank area of the start zone after the buffer zone, the session control block comprising volume data indicative of the status and the contents of the session; and closing the session for constituting the information volume by recording session control data indicating that the information volume is closed in the remaining blank area, and closure data after the last information recorded in the data zone for constituting the end zone of the volume, wherein the session control block comprises a drive identification indicating the device that has recorded that session control block.

3. A record carrier having a track in a recordable area for recording at least one information volume, said at least one information volume comprising a start zone, a data zone and an end zone, the track comprising marks representing the information and control data constituting the information volume, characterized in that the record carrier comprises:

an opened session having intro data comprising a first buffer zone at the beginning of the start zone of the volume, and at least one session control block in a remaining blank area of the start zone after the buffer zone, the session control block (SDCB) comprising volume data indicative of the status and the contents of the session; and a closed session constituting the information volume comprising session control data indicating that the information volume is closed in the start zone, and closure data after the last information recorded in the data zone for constituting the end zone of the volume, wherein the session control block comprises a drive identification indicating the device that has recorded that session control block.

* * * * *